United States Patent [19]

Sekerchak

[11] Patent Number: 5,178,422
[45] Date of Patent: Jan. 12, 1993

[54] GAS APPLIANCE CONNECTOR ASSEMBLY

[75] Inventor: Richard C. Sekerchak, Irwin, Pa.

[73] Assignee: Dormont Manufacturing Company, Pittsburgh, Pa.

[21] Appl. No.: 872,507

[22] Filed: Apr. 23, 1992

Related U.S. Application Data

[63] Continuation-in-part of Ser. No. 719,950, Jun. 24, 1991, abandoned.

[51] Int. Cl.$^5$ ............................................. F16L 27/02
[52] U.S. Cl. .................................. 285/160; 285/168; 285/164; 285/119; 137/615; 126/38
[58] Field of Search ............... 285/168, 269, 181, 119, 285/160, 163, 164, 165; 126/38, 42, 396, 52; 137/615, 75

[56] References Cited

U.S. PATENT DOCUMENTS

| | | | |
|---|---|---|---|
| 1,393,987 | 10/1921 | Wampler | 285/168 |
| 1,928,279 | 9/1933 | Bard . | |
| 2,712,456 | 7/1955 | McCreery . | |
| 3,141,473 | 7/1964 | Mejyr | 137/615 |
| 3,200,807 | 8/1965 | Culligan . | |
| 3,558,163 | 1/1971 | Moore et al. | 285/276 |
| 3,858,601 | 1/1975 | Ensinger | 285/168 |
| 3,900,221 | 8/1975 | Fouts . | |
| 4,615,547 | 10/1986 | Sutcliffe . | |

FOREIGN PATENT DOCUMENTS 589273 7/1932 Fed. Rep. of Germany .
746015 5/1933 France .
963720 7/1950 France .

Primary Examiner—Eric K. Nicholson
Attorney, Agent, or Firm—Buchanan Ingersoll; Paul A. Beck

[57] ABSTRACT

A connector assembly for delivering natural gas or propane from a fixed pipe having a shut-off valve to a moveable gas cooking appliance on casters is provided in which a swivel is coupled with a connector which in turn is coupled between the shut-off valve and the gas appliance. The swivel maintains its shape and physical characteristics at least up to 800° F. temperature for at least ten minutes. The swivel has a first body member which has a first and second end. A nut is rotatably coupled to the first end of the first body member. The first body member is rotatable about a fixed first axis with respect to the nut which is coupled to the shut-off valve. The swivel has a second body member having a first and second end. The first end of the second body member is rotatably coupled to the second end of the first body member. The first end of the second body member is rotatable about a second axis which intersects the fixed first axis and is rotatable with respect to the fixed first axis. The second body member of the swivel having a third axis at the second end and adjacent to the fixed first axis rotatable about the fixed first axis and intersecting the second axis. A connector is coupled at one end to the second end of the second body member of the swivel. The other end of the connector is coupled to the gas cooking appliance.

24 Claims, 13 Drawing Sheets

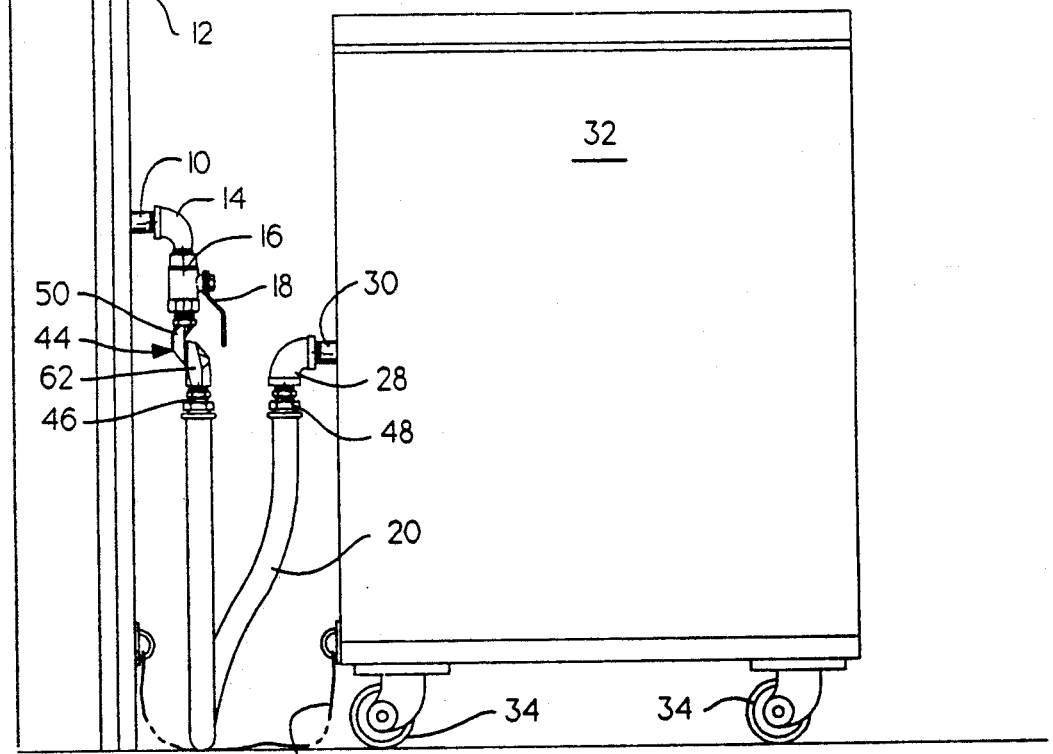
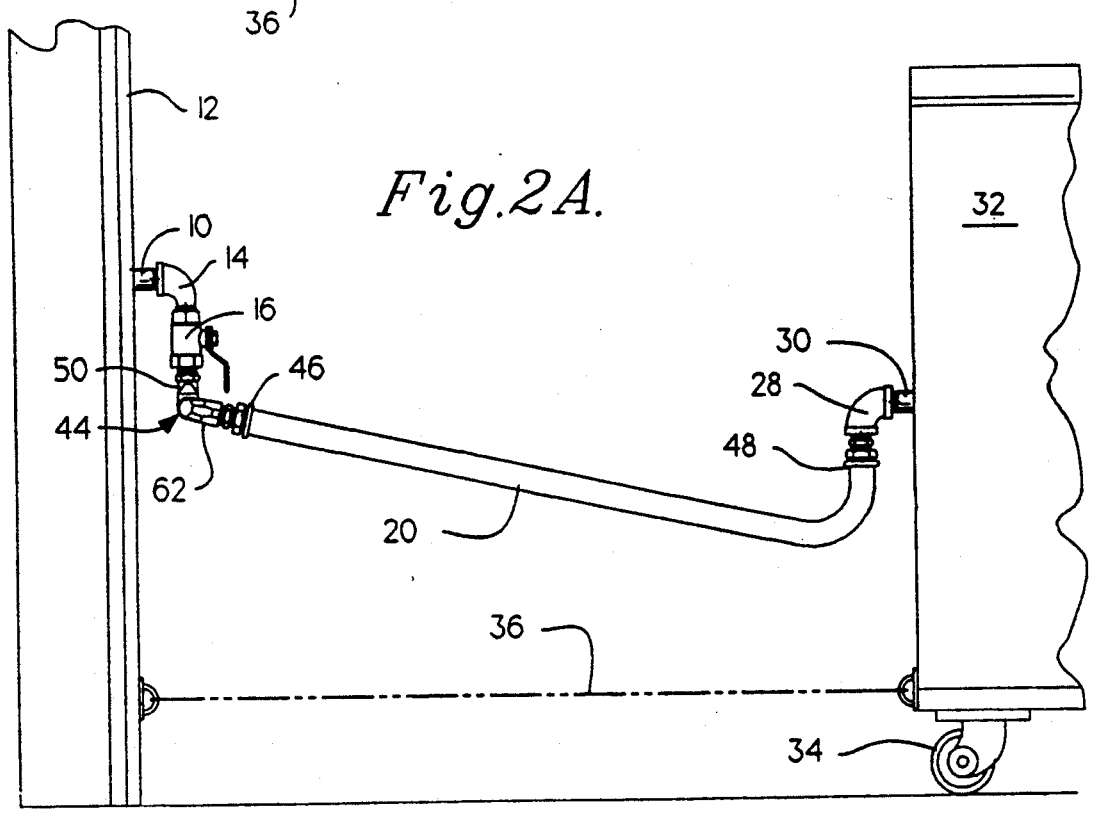

GAS APPLIANCE CONNECTOR ASSEMBLY

REFERENCES TO RELATED APPLICATION

This application is a continuation-in-part of my pending application, Ser. No. 07/719,950, filed Jun. 24, 1991 now abandoned.

BACKGROUND OF THE INVENTION

1. Field of the Invention natural gas or propane under pressure from a fixed pipe to a gas cooking appliance which is moveable on casters toward and from the fixed pipe. The apparatus is for use in the food service industry. It includes a connector coupled to a swivel for connecting a source of natural gas or propane to the gas appliance.

2. Description of the Prior Art

Gas appliance connector assemblies currently are being used in the food service industry. These assemblies are used to connect cooking appliances to a source of natural gas or propane under pressure. The source of gas supply comes from a fixed or stationary pipe having a shut off valve. The fixed pipe is usually mounted on or extends from a wall surface. This type of system is found in a large or commercial kitchen environment where the cooking appliance has heavy continuous use throughout the day. The appliance may be a fryer, range, grill or other type of cooking appliance. Usually, many of these appliances are located together. It is not uncommon to have fryers, numerous grills and other cooking equipment together. This equipment causes substantial grease and dirt deposits in the area of the appliance. The gas cooking appliance needs regular daily cleaning and the floor under it and the wall adjacent to the appliance need regular cleaning to keep grease from building with dirt, grime and food deposits causing sanitation problems. To clean the area and the appliance it must be moved. Large casters under the appliance permit easy movement. Floor space is at a premium in commercial kitchens, kitchens in restaurants and fast food enterprises. To accommodate the premium floor space, the cooking appliance is often moved as close to the wall with the fixed pipe as possible. This is shown in FIG. 1 (Prior Art). This causes major problems in the connector which bends and reverse bends in moving the appliance away from the wall and toward the wall. These repeated bends and reverse bends cause work hardening which causes the connector to break.

FIG. 1 shows a fixed pipe 10 extending from a wall 12. The pipe 10 has a 90° street elbow 14 coupled to a shut-off valve 6 which has a handle 18. Coupled to the shut-off valve 16 is a connector 20 with nut 22. The opposite end of the connector 20 is coupled by nut 24 to a quick-disconnect device 26 which in turn is coupled to a 90° street elbow 28 to the pipe 30 of a gas cooking appliance 32. The gas appliance 32 has casters 34 to facilitate easy movement of the gas appliance 32 away from the wall 12 and into various locations. This enables one to clean the area occupied by the gas appliance 32. A safety chain 36 attached to the wall 12 and the appliance 32 restrains appliance 32 to a movement to a maximum of six feet from the fixed pipe 10. The appliance 32 is pushed against the wall 12 as close as possible to conserve scarce floor space and in doing so causes a bend 38 in the connector 20.

The connector 20 is made in accordance with the *American National Standard for Connectors for Movable Gas Appliances,* approved Mar. 10, 1987 by the American National Standards Institute, Inc. ANSI Z 21.69-1987. The ANSI Z 21.69-1987 standard publication is incorporated by reference as to Part I CONSTRUCTION, Part II PERFORMANCE and Part IV DEFINITIONS. Part II provides under Section 2.6 TENSION AND FLEXURE STRENGTH that a connector shall withstand 100 cycles of flexing without leakage in excess of 10 cubic centimeters per hour while subjected to a lengthwise pull of 300 pounds per inch (52.5 KN/m) of nominal tubing diameter. Section 2.7 TORSION STRENGTH—provides that a connector shall withstand 30 applications of a twisting force applied in alternate directions without damage to the tubing or fittings or leakage in excess of 10 cubic centimeters per hour. Part IV provides that a corrugated connector is a metal connector having the gas conduit fabricated of metal tubing formed into helical or annular corrugations. It further provides that a quick disconnect device is a hand operated device which provides a means for connecting and disconnecting an appliance or an appliance connector to a gas supply and which is equipped with an automatic means to shut off the gas supply when the device is disconnected.

The quick-disconnect device 26 for quickly disconnecting the connector 20 from the 90° street elbow 28 connecting the pipe 30 of the gas appliance 32 is made in accordance with American National Standard for Quick-Disconnect Devices for Use with Gas Fuel, approved Jan. 16, 1989 by the American National Standards Institute, Inc. ANSI Z 21.41-1989. ANSI Z 21.41-1989 standard publication is incorporated by reference as to Part I CONSTRUCTION—providing: the scope of the device which provides a means for connecting and disconnecting appliances or appliance connectors to gas supplies; the operation of the device which shall not require the use of tools to either connect or disconnect the devices; and the assembly which provides that the mating parts cannot be assembled incorrectly, unless such incorrect assembly would not permit the gas to flow.

The connector 20 is made of stainless steel tubing. It is corrugated. The connectors range in diameter from ¾" to 1¼" and at lengths from 12" to 72". This connector 20 is designed to withstand high levels of stress and torsion with the quick-disconnect coupling 26. The tubing forming the connector 20 is corrugated and is flexible. The connectors 20 have a stainless steel braid over which a plastic coating is applied. Other types of connectors 20 do not have the coating but do have the braid covering it. This design was made to meet the demanding needs of the food service industry. The connector 20 allowed the use of casters 34 for the movement of commercial appliances 32 such as fryers, ovens and ranges. This type of connector 20 is used with the quick-disconnect 26 and the shut-off valve 16. This system is now the industry standard.

The connector 20, however, develops stresses when the gas appliance 32 is pulled away from the wall 12 as shown in FIG. 1A.

The bend 40 in the connector 20 in FIG. 1A and the bend 42 in FIG. 1A occur when the appliance 32 is pulled away from the wall 12 to permit cleaning the area previously occupied by the appliance 32. These bends 40 and 42 wrinkle the plastic coating as shown in the drawing and place extreme stresses on the connector 20 which when repeated daily cause the connector 20 to work harden and then to break and leak gas which results in a shortened life of the connector 20 and a dangerous condition.

Whenever the floor area is cleaned between the wall 12 and the appliance 32, the wall 12 area adjacent the appliance 32 is also cleaned and the appliance 32 itself is cleaned. After cleaning, the appliance 32 is rolled back toward the wall 12 and is pushed toward the wall 12 as far as it will move. The torsion forces in the connector 20 can have a tendency to resist this movement toward the wall 12. The daily frequent movement of the appliance 32 away from the wall 12 and back toward the wall 12 again causes extreme bends in the connector 20. Eventually this causes work hardening of the steel and the connector 20 breaks causing a gas leak. Also, the appliance 32 is frequently moved laterally in a diagonal away from the wall 12 instead of directly perpendicularly away from the wall 12. This causes bending and torsion stresses in the connector 20.

It is easier for the maintenance and cleaning personnel to leave the connector 20 connected to the appliance 32 rather than to disconnect the connector 20 from the appliance 32 using the quick-disconnect device 26. Therefore, most of the time rather than disconnect the connector 20 from the gas appliance 32 the cleaning and maintenance personnel leave the connector 20 coupled to the gas appliance 32.

It is this particular problem which causes the excessive bend stresses in the connector 20 and the torsion forces in the connector 20 which is coupled from a fixed pipe 10 extending from a wall 12 surface to a gas moveable cooking appliance 32 on casters 34 which the inventor solved with his new combination of elements.

SUMMARY OF THE INVENTION

I provide an apparatus for delivering natural gas or propane from a fixed pipe having a shut-off valve to a gas appliance mounted on casters which is moveable toward and away from the fixed pipe. The apparatus has a swivel that maintains its shape and physical characteristics at least up to 800° F. temperature for at least ten minutes and having a first body member having a first and a second end. The swivel has a nut rotatably coupled to the first end of the first body member. The first body member is rotatable about a fixed first axis with respect to the nut. The nut has a male portion extending from the nut and is coupled to the shut-off valve. The swivel has a second body member having a first and second end. The first end of the second body member is rotatably coupled to the second end of the first body member. The first end of the second body member is rotatable about a second axis which intersects the fixed first axis and is rotatable with respect to the fixed first axis. The second body member of the swivel having a third axis at the second end and adjacent to the fixed first axis and rotatable about the fixed first axis and intersecting the second axis. I provide a connector having a first and a second end. The first end of the connector is coupled to the second end of the second body member of the swivel. The second end of the connector is coupled to the gas appliance. The connector meets the standards of at least the *American National Standard for Connectors for Moveable Gas Appliances,* ANSI Z 21.69-1987.

I preferably provide that the swivel is resistive to corrosive materials found in food grease cutting agents and that the rotatable nut is brass and the first and second body members of the swivel are aluminum. I preferably provide that the connector is corrugated stainless steel tubing having a braided stainless steel sheath protector surrounding the corrugated tubing and a coating of polyvinyl chloride or other protective plastic material surrounding the braided sheath. I preferably provide a quick-disconnect coupling device coupling the first end of the first body member of the swivel to the shut-off valve. The quick-disconnect coupling device meets the standards of at least the *American National Standard for Quick-Disconnect Devices for Use with Gas Fuel,* ANSI Z 21.41-1989.

I provide that the fixed first axis of the swivel is oriented at an angle with respect to the second axis.

I provide that the swivel and the quick-disconnect device may be installed in a number of different arrangements. I also provide that two swivels may be installed at each end of the connector to provide an optimum in flexibility and range of movement.

Using the new apparatus, torsion and bending stresses are greatly relieved when appliance equipment is moved and it provides longer life for the gas connector. The use of the swivel permits at least 230° spherical movement which increases the flexibility and range of movement of the connector. It enables a food service operator to position equipment closer to the wall from which the fixed pipe extends. This will reduce dead space that creates sanitation problems, provide more space for people to work and lower the high cost of a ventilation hood area. It also permits lateral movement of the appliance to and from the wall and reduces torsion in the connector while the lateral movement is made.

This apparatus will save time and money because it permits faster maintenance of the appliance and cleaning of the appliance and the surrounding area and enhances the life of the connector while safety is increased.

The increased range of motion enables equipment to be moved in and out with less effort making cleaning and servicing easier. The natural motion of the swivel reduces the tension and torsion stress on the connector caused by bends and twists.

DESCRIPTION OF THE DRAWINGS

FIG. 2 is an elevational view of a gas appliance coupled to a gas supply line having a shut-off valve and swivel, in which the appliance is adjacent to the wall.

FIG. 2A is a view similar to FIG. 2 having the gas appliance moved to its maximum distance from a wall.

DESCRIPTION OF THE PREFERRED EMBODIMENTS

Figure 1:
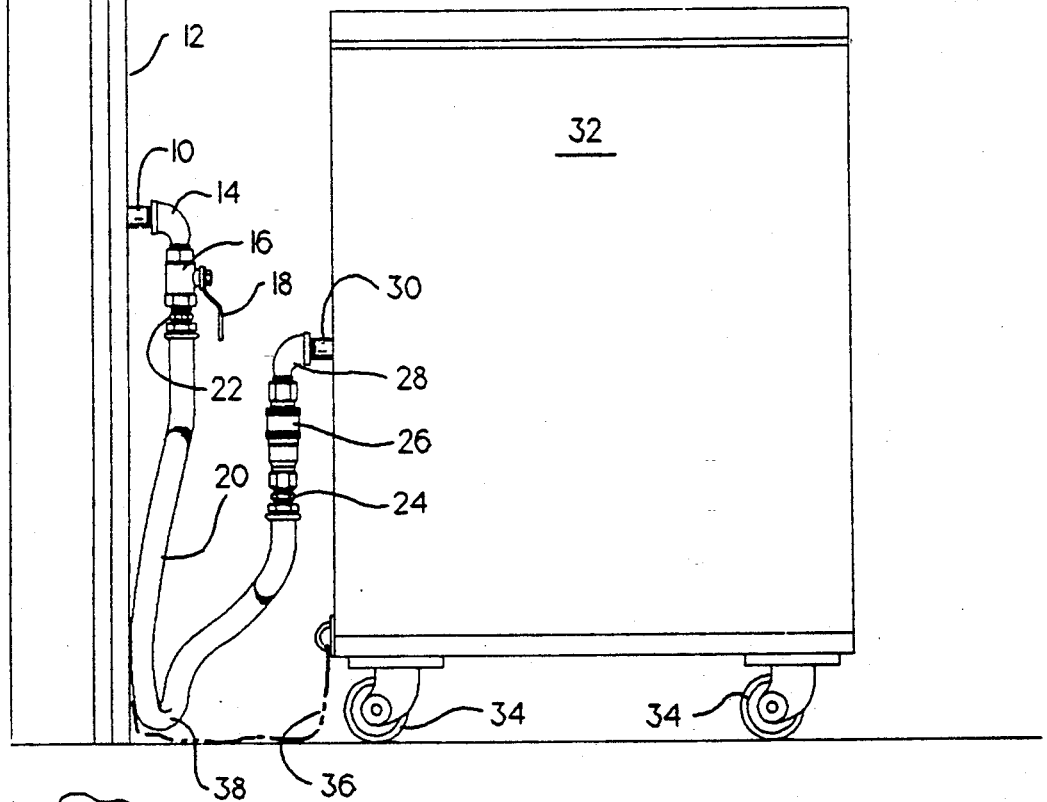
FIG. 1 is an elevational view of the prior art of a g as appliance coupled to a gas supply line and positioned adjacent to a wall.

Referring to FIGS. 2 and 2A, there is shown an apparatus for delivering natural gas or propane under pressure from a fixed pipe 10 having a shut-off valve 16 with a handle 18 to a gas cooking appliance 32 mounted on casters 34 and which is moveable toward and away from the fixed pipe 10 adjacent to a wall 12. A swivel 44 is coupled to the shut-off valve 16. The swivel 44 is also coupled to a stainless steel connector 20. The connector 20 has a first end 46 which is coupled to the swivel 44 and a second end 48 which is coupled to the gas cooking appliance 32.

Figure 14:
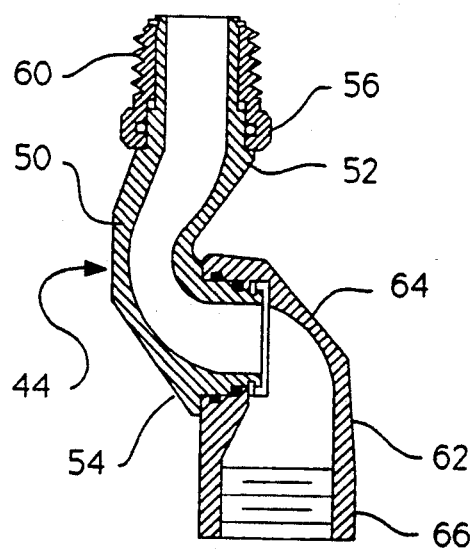
FIG. 14 is a sectional view of the swivel shown in FIG. 13.
Figure 13:
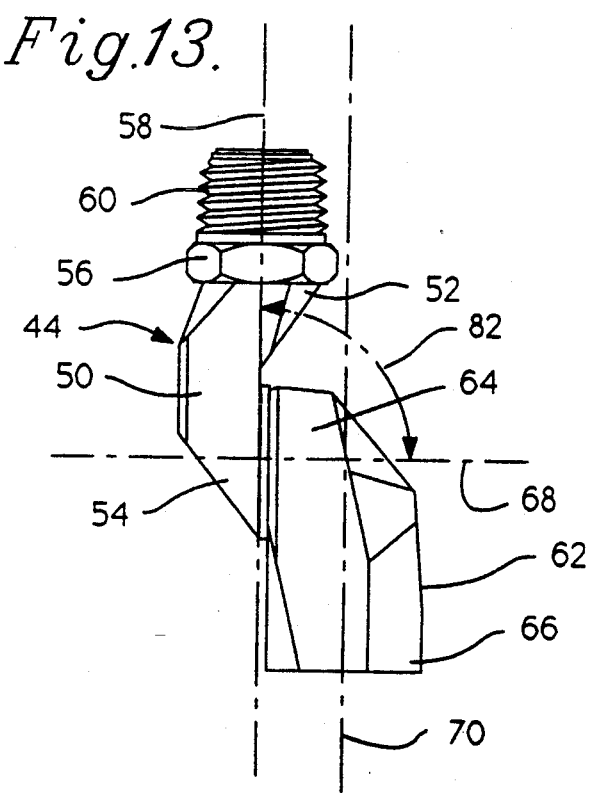
FIG. 13 is an elevational view of a swivel showing three axes.

FIGS. 13 and 14 show the swivel 44 in greater detail. The swivel is generally shown as 44. The swivel 44 will maintain its shape and physical characteristics at least up to 800° F. temperature for at least ten minutes. It is made of brass and aluminum which will enable it to perform in this manner. The swivel 44 has a first body member 50 (shown in FIGS. 13 and 14) which has a first end 52 and a second end 54. A nut 56 is rotatably coupled to the first end 52 of the first body member 50. The first body member 50 is rotatable about a fixed first axis 58 with respect to the nut 56. The nut 56 has a male portion 60 which extends from the nut 56 and is coupled to the shut-off valve 16 shown in FIGS. 2 and 2A. The male portion 60 is threaded to the shut-off valve 16. When this is done the male portion is fixed and does not rotate. The first end 52 of the first body member 50 can rotate with respect to the male portion 60 and nut 56 about the fixed first axis 58. The swivel 44 has a second body member 62 which has a first end 64 and a second end 66. The first end 64 of the second body member 62 is rotatably coupled to the second end 54 of the first body member 50. The first end 64 of the second body member 62 is rotatable about a second axis 68 which intersects the fixed first axis 58 as shown in FIG. 13. The first fixed axis 58 is oriented at an angle 82 with respect to the second axis 68. The second axis 68 is rotatable with respect to the fixed first axis 58 because the first body 50 is rotatable about the first fixed axis 58. The second body member 62 has a third axis 70 at the second end 66 of the second body member 62. The third axis 70 is adjacent to the fixed first axis 58 and it is rotatable about the fixed first axis 58 because the first body member 50 is rotatable with respect to nut 56 and the first body member 50 carries the second body member 62 in the rotational movement. The third axis 70 intersects the second axis 68.

The first end 46 of the connector 20 shown in FIGS. 2 and 2A is coupled to the second end 66 of the second body member 62 of the swivel 44 shown in FIGS. 13 and 14.

The swivel 44 is resistive to corrosive materials contained in food grease cutting agents. To enable the swivel to resist the corrosive materials and maintain its shape and physical characteristics at least up to 800° F. for at least ten minutes the rotatable nut 56 and male portion 60 are made of brass and the the first and second body members 50 and 62 of swivel 44 are aluminum.

Figure 1A:
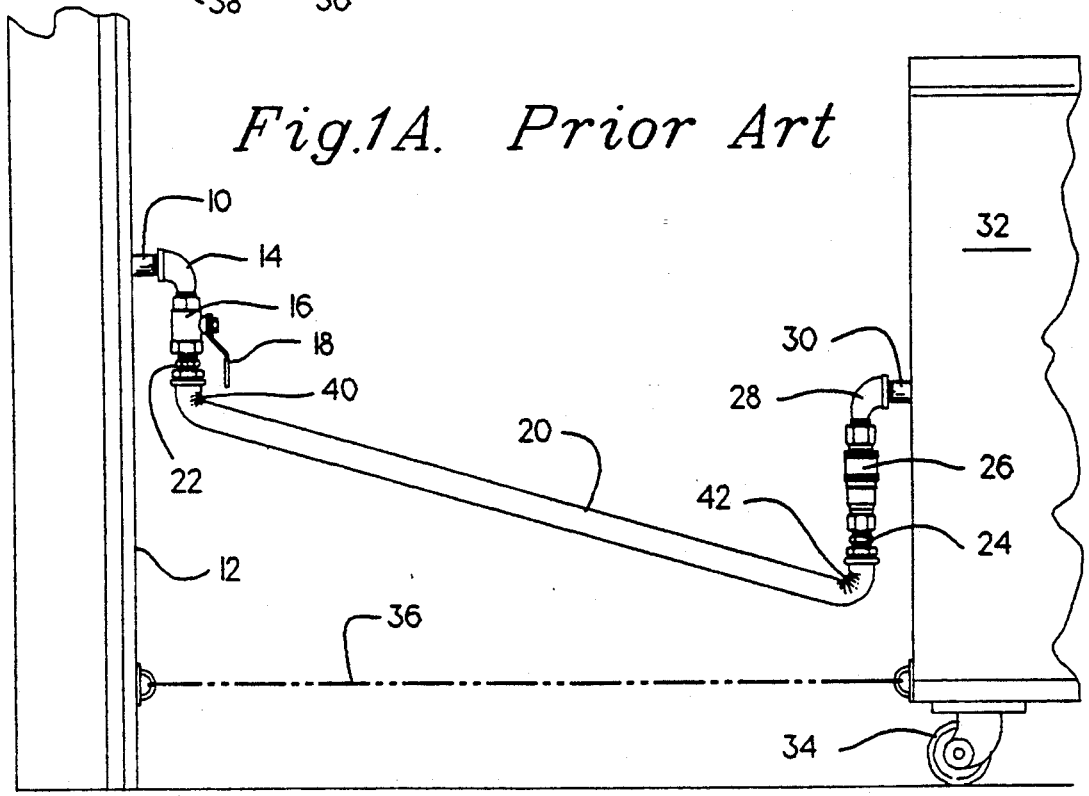
FIG. 1A is a view of the prior art similar to FIG. 1 with the gas appliance moved to its maximum distance from the wall.

The rotatable relationship of the first body member 50 and the second body member 62 with respect to the three axes 58, 68 and 70 permits the connector 20 to be moved and manipulated in a wide variety of positions and angles with respect to the fixed pipe 10. This was not possible in the connector 20 apparatus shown in FIGS. 1 and 1A showing the prior art. Whenever the gas cooking appliance 32 in FIG. 2 is pulled away from the wall 12 the swivel 44 avoids a bend at the connector 20 coupled to the second body member 62 of the swivel 44 and avoids the severe bend of the connector at the 90° street elbow 28. This is possible because the second body member 62 is rotatable about axis 68 with respect to the first body member 50. The arresting safety chain 36 is limited to six feet and permits further movement of the gas cooking appliance 32 from the wall 12 and fixed pipe 10.

The swivel 44 also facilitates lateral movement of the appliance 32 from the wall 12 when the appliance 32 is moved at a diagonal because the first body member 50 is rotatable about the fixed first axis 58 and nut 56 which is threaded to the fixed pipe 10 extending from the wall 12. This permits the second body member 62 to rotate about the fixed first axis 58.

Figure 4:
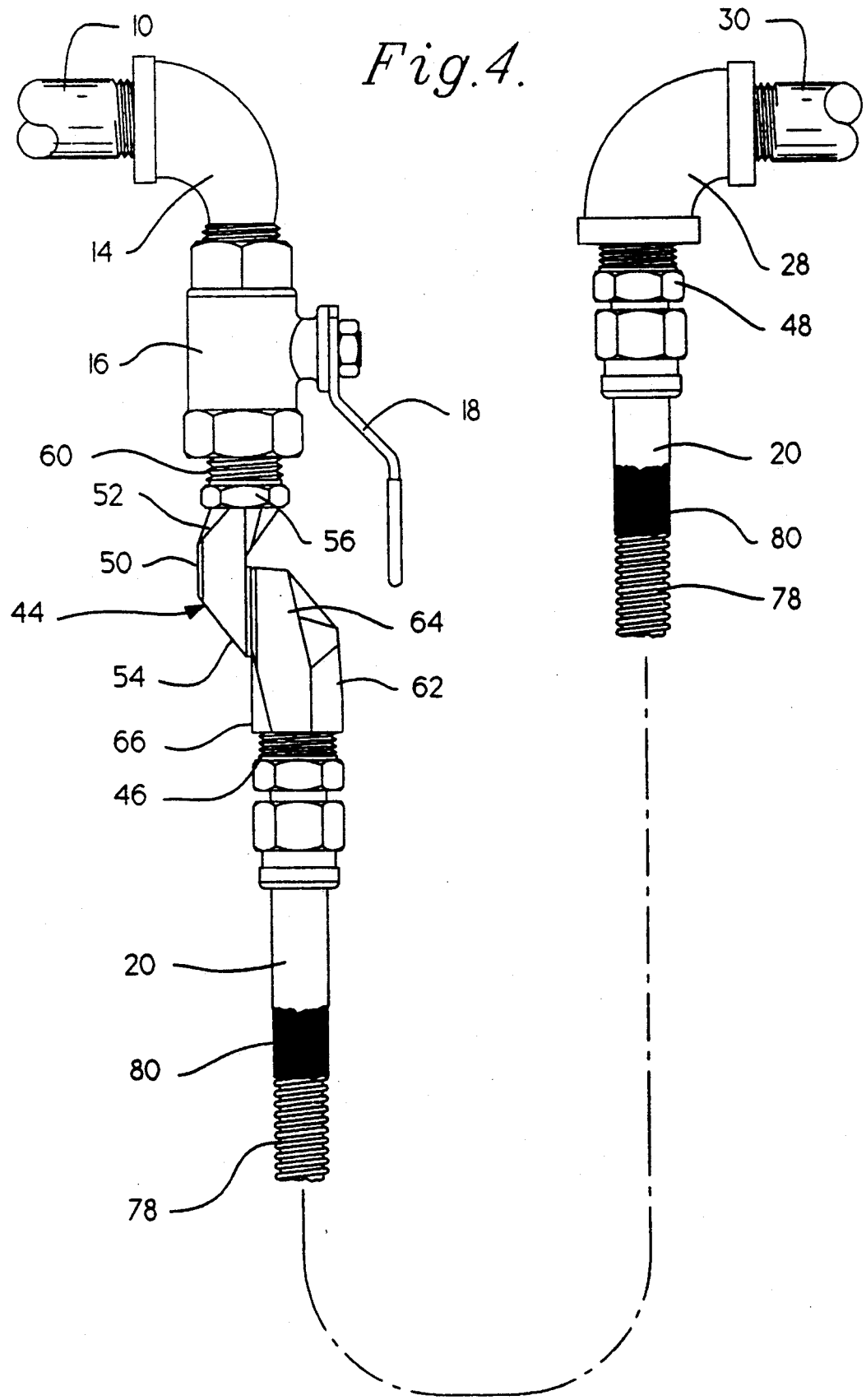
FIG. 4 is an elevational view which is enlarged of the apparatus for delivering gas to a gas appliance as shown in FIGS. 2 and 2A.

FIG. 4 is an enlarged view of the apparatus shown in FIGS. 2 and 2A and is broken in chain line. It shows the fixed pipe 10 with a 90° street elbow 14 coupled to the shut-off valve 16. The swivel 44 has a nut 56 with a male portion 60 threaded into the shut-off valve 16. The swivel 44 has a first body member 50 having a first end 52.

The first body member 50 has a second end 54 which is rotatably coupled to a second body member 62 of the swivel 44 at a first end 64 of the second body member 62. The first end 46 of connector 20 is threaded into the second end 66 of the second body member 62. The second end 48 of the connector 20 is threaded into the 90° street elbow 28 of the appliance pipe 30. The connector 20 is broken in chain line as shown in FIG. 4. The connector 20 is made of corrugated stainless steel tubing. The corrugations 78 are covered by a stainless steel braid 80 which acts as a sheath over the corrugations. Surrounding the braid 80 is a coating of polyvinyl chloride.

Figure 3:
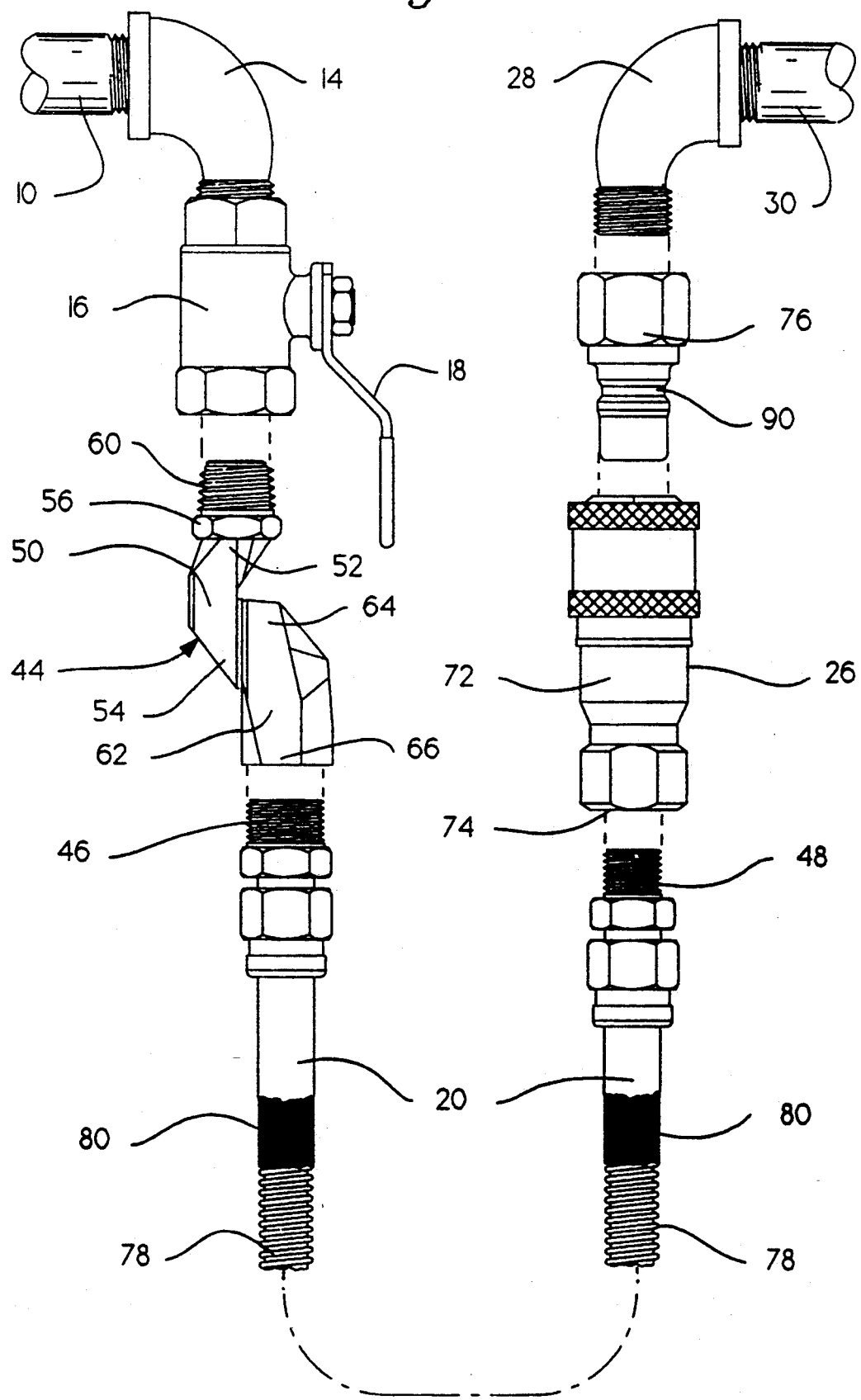
FIG. 3 is an exploded view of separated components used for the apparatus.
Figure 16:
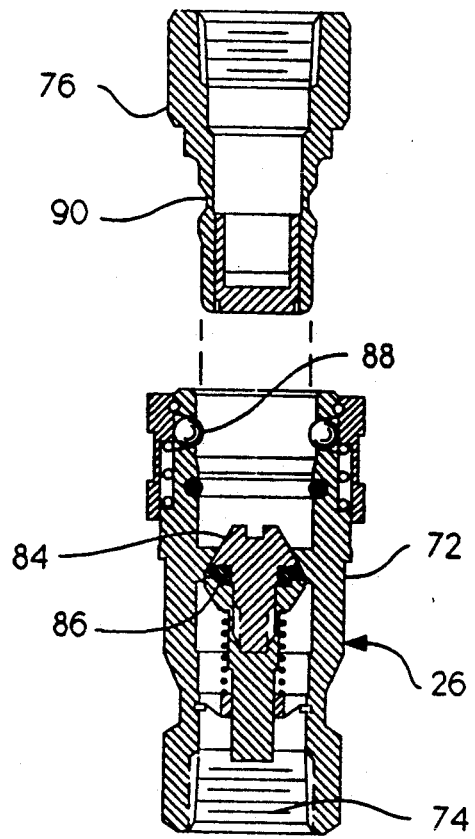
FIG. 16 is a sectional exploded view of the quick-disconnect device shown in FIG. 16.
Figure 15:
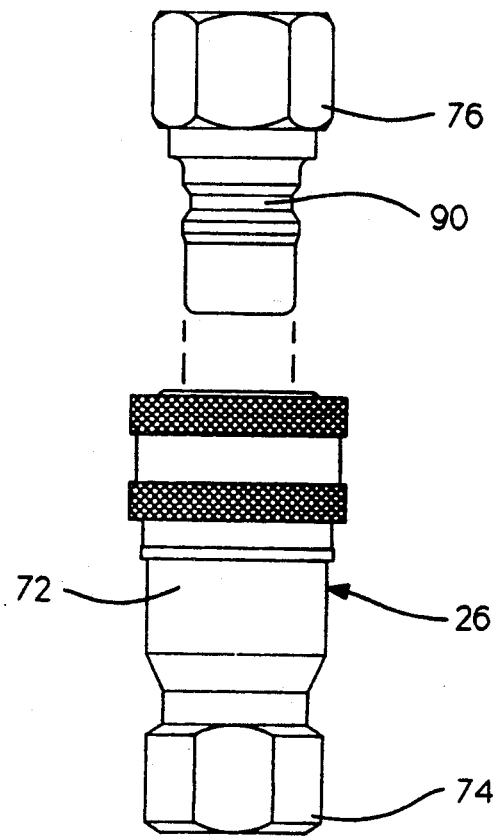
FIG. 15 is an elevational exploded view of a quick-disconnect device showing a plug separated from the quick-disconnect body.

FIG. 3 is a similar arrangement in broken chain line to that shown in FIG. 4 but includes a quick-disconnect device 26 which is shown separately in FIGS. 15 and 16. The quick-disconnect device 26 has a main body 72, a threaded end 74, a plug 76 which is inserted into the main body 72 which has a valve 84 and a valve seat 86. The main body 72 has a ball 88 which engages a detent 90 in the plug 76 and maintains the connection between the main body 72 and the plug 76. When the plug 76 is inserted into the main body 72 it unseats the valve 84 downwardly in the main body 72 and permits gas to flow. Whenever the plug 76 is removed from the main body 72, the valve is urged toward the valve seat 86 and the gas is shut off. This is the operation of the quick-disconnect device 26.

Because of the use of the swivel 44, the gas shut-off valve 16 does not have to be shut off and the quick-disconnect 26 does not have to be disengaged in order to move the gas appliance and clean the adjacent area. However, the quick-disconnect 26 is used when the gas appliance must be moved more than six feet which is the maximum length of the safety arrest chain 36.

As shown in FIG. 3 the quick-disconnect 26 is threaded at the plug 76 onto the 90° street elbow 28 which is threaded to the appliance pipe 30. The threaded end 74 of the main body 72 of the quick-disconnect 26 is threaded to the second end 48 of the connector 20.

Figure 5:
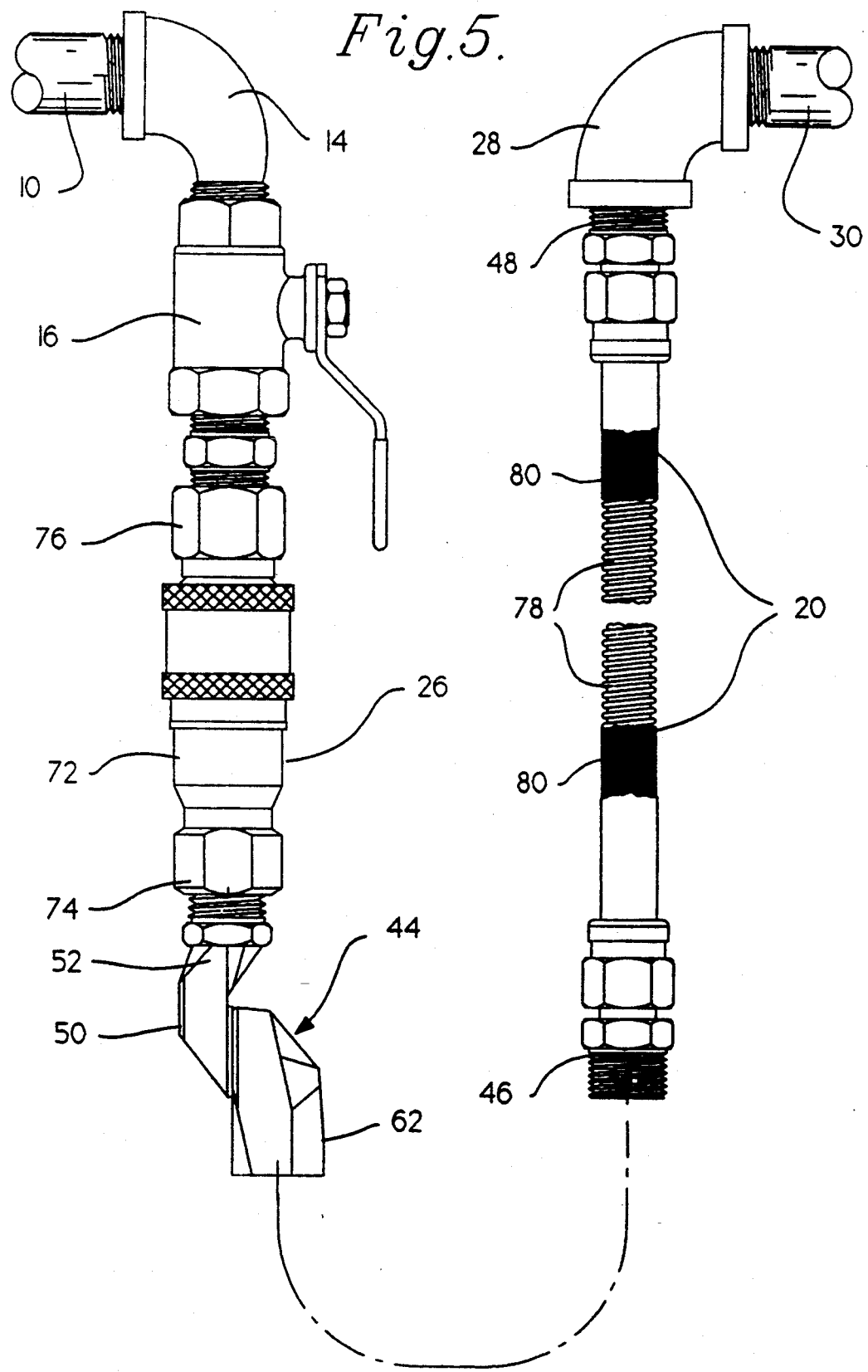
FIG. 5 is an arrangement similar to FIG. 4 and having a quick-disconnect coupling device inserted between a swivel and a shut-off valve.

FIG. 5 is another embodiment and similar to FIG. 4 showing the quick disconnect 26 coupled between the swivel 44 and the shut-off valve 16. The quick-disconnect 26 is coupled to the first end 52 of the first body member 50 of the swivel 44 by threaded end 74 of the main body 72. The plug 76 of the quick-disconnect is threaded by a coupling into the shut-off valve 16. The second body member 62 of the swivel 44 is coupled to the first end 46 of the connector 20.

Figure 6:
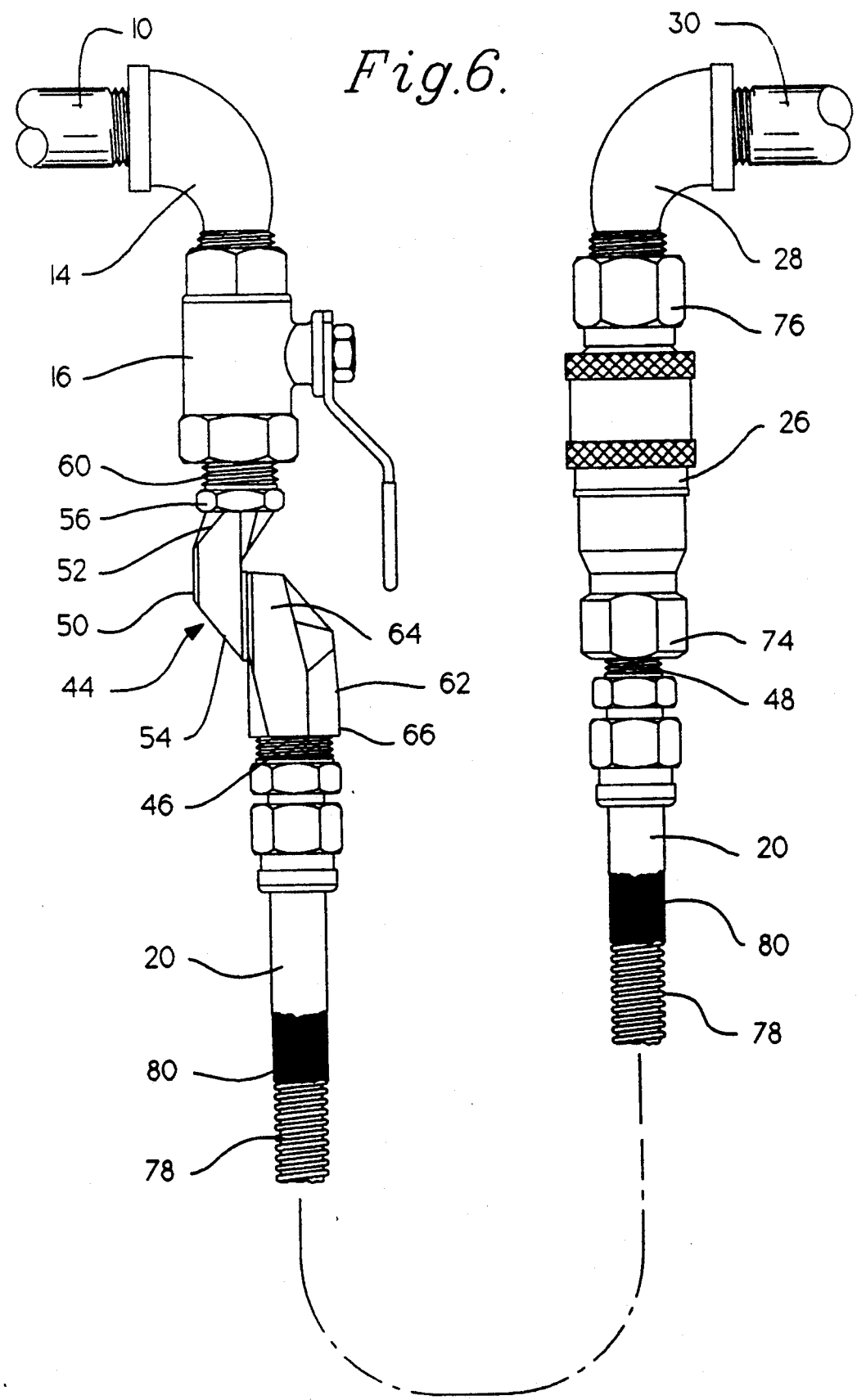
FIG. 6 is an arrangement similar to FIG. 4 and having a quick-disconnect coupling device inserted between a gas appliance and a connector.

FIG. 6 shows another embodiment and similar to FIG. 4 with a quick-disconnect 26 with the plug 76 threaded to the 90° street elbow 28 and the threaded end 74 threaded to the second end 48 of the connector 20.

Figure 7:
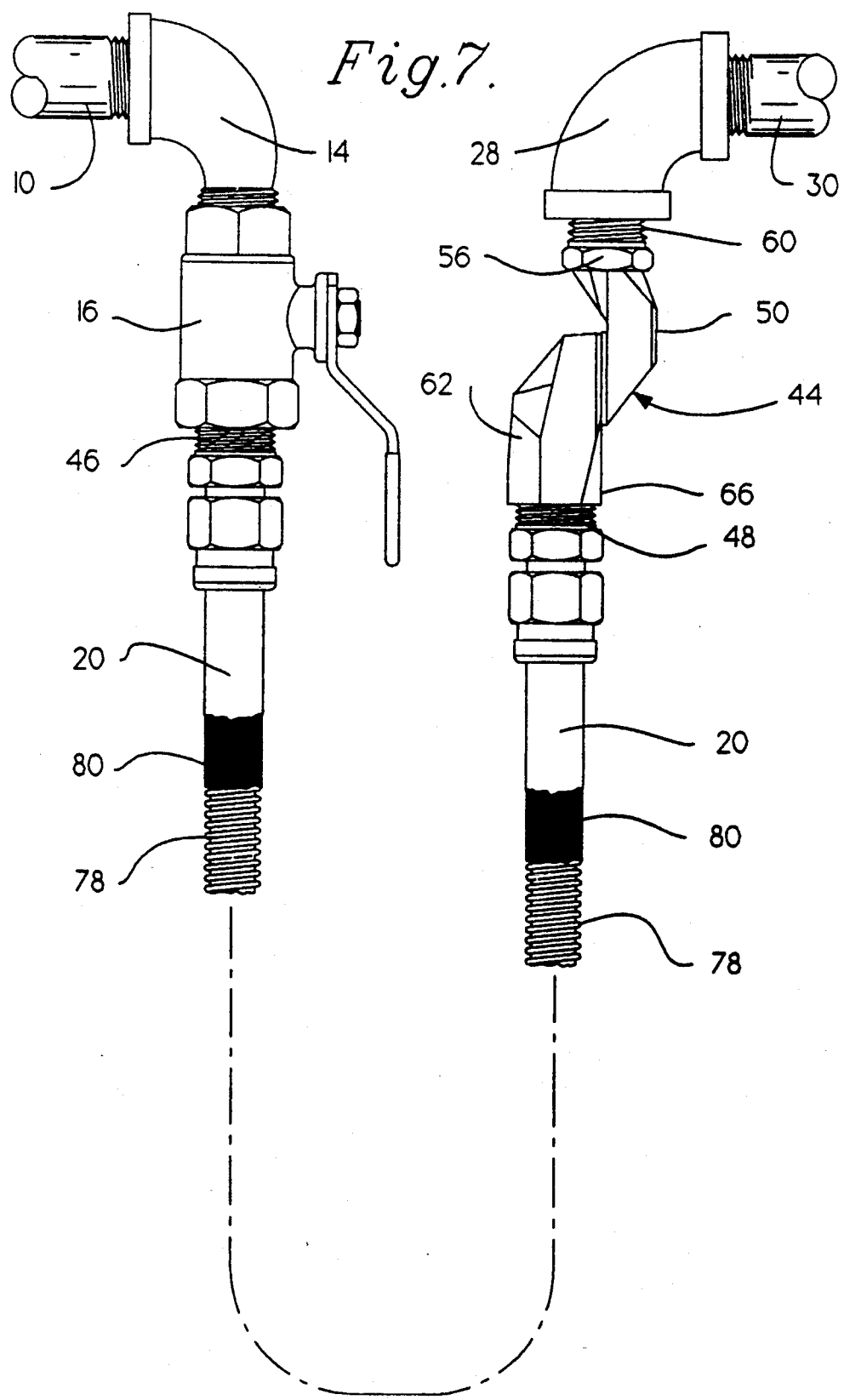
FIG. 7 is an elevational view of another embodiment of a gas appliance coupled to a gas supply line having a shut-off valve and swivel. The swivel is coupled to the gas appliance.

FIG. 7 shows another embodiment with the swivel 44 with the male portion 60 coupled to the 90° street elbow 28 and the second end 66 of the second body member 62 coupled to the connector 20 at the second end 48 of the connector 20. The first end 46 of the connector 20 is coupled to the shut-off valve 16.

Figure 8:
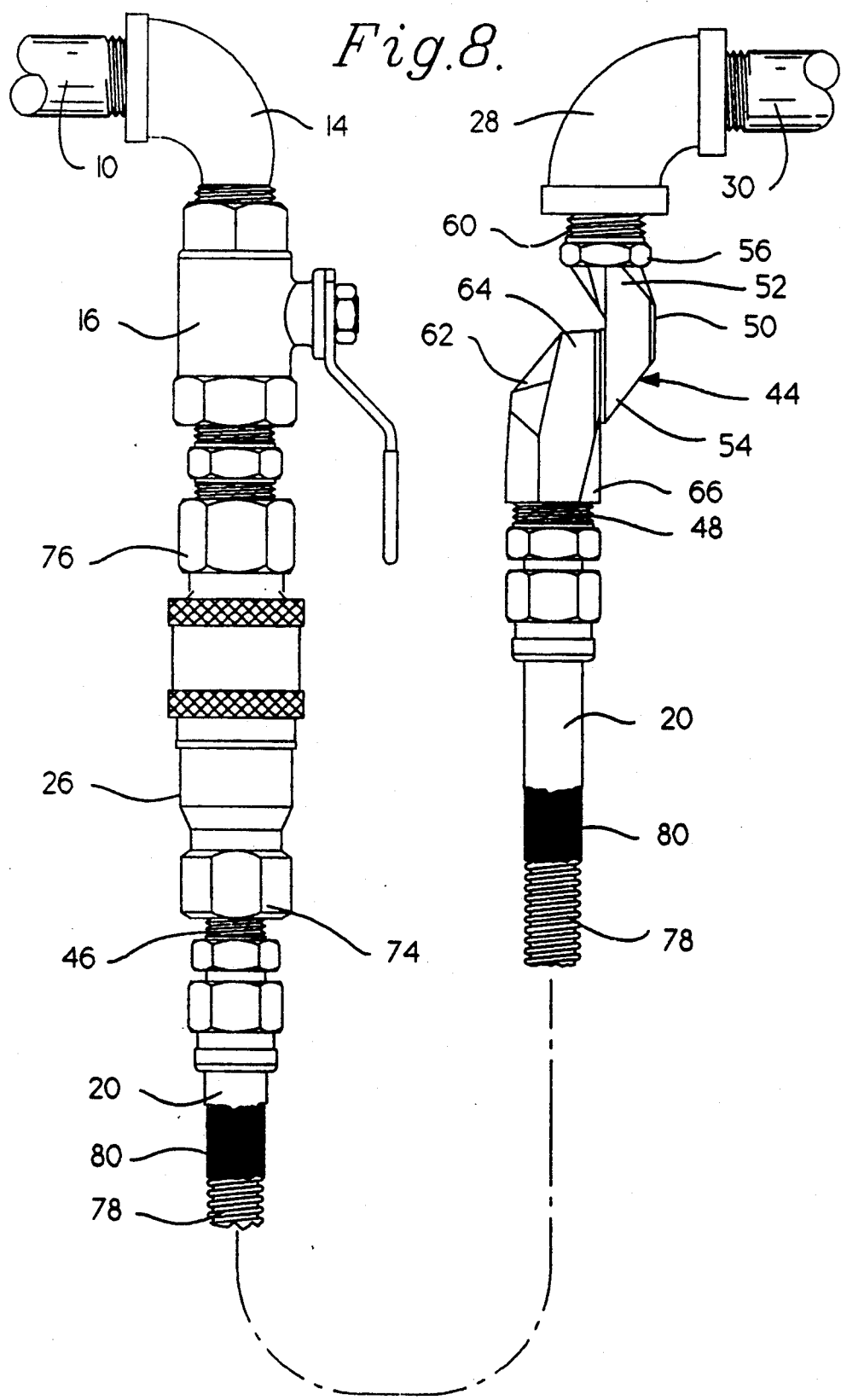
FIG. 8 is an arrangement similar to FIG. 7 having a quick-disconnect coupling device inserted between the connector and the shut-off valve.

FIG. 8 shows another embodiment of the invention as shown in FIG. 7 with the addition of a quick-disconnect 26 coupling the first end 46 of the connector 20 and the plug 76 of the quick-disconnect 26 to the shut-off valve 16.

Figure 9:
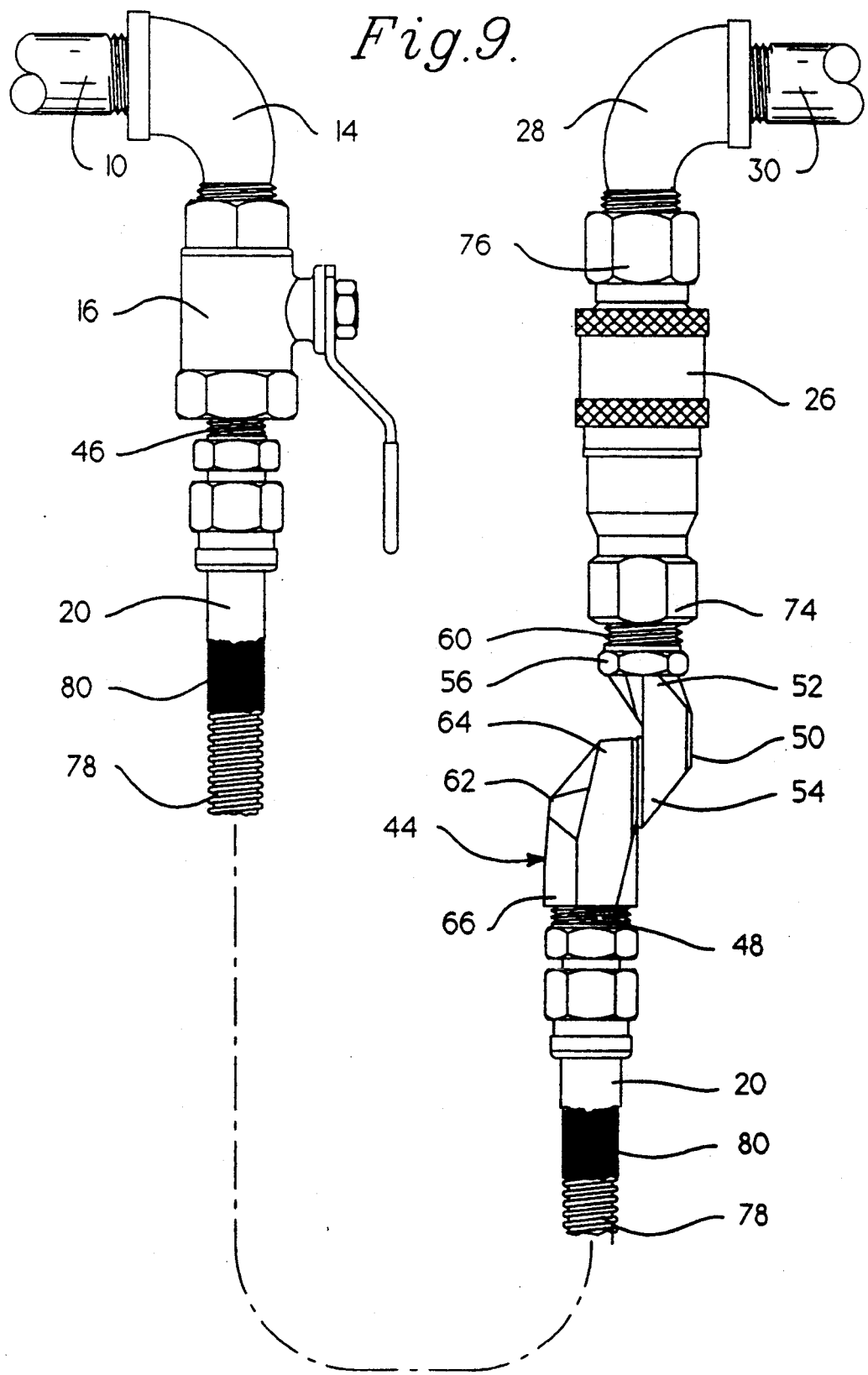
FIG. 9 is an elevational view of another embodiment of a gas appliance coupled to a gas supply line having a quick-disconnect device coupled between a swivel and a gas appliance.

FIG. 9 shows another embodiment of the invention shown in FIG. 7 with the addition of a quick-disconnect 26 coupling the swivel 44 to the 90° street elbow 28 gas cooking appliance pipe 30. The plug 76 of the quick-disconnect 26 is threaded to the 90° street elbow 28. The threaded end 74 of the quick-disconnect 26 is threaded to the male portion 60 of the swivel 44. The second end 66 of the second body 62 is threaded to the second end 48 of the connector 20.

Figure 10:
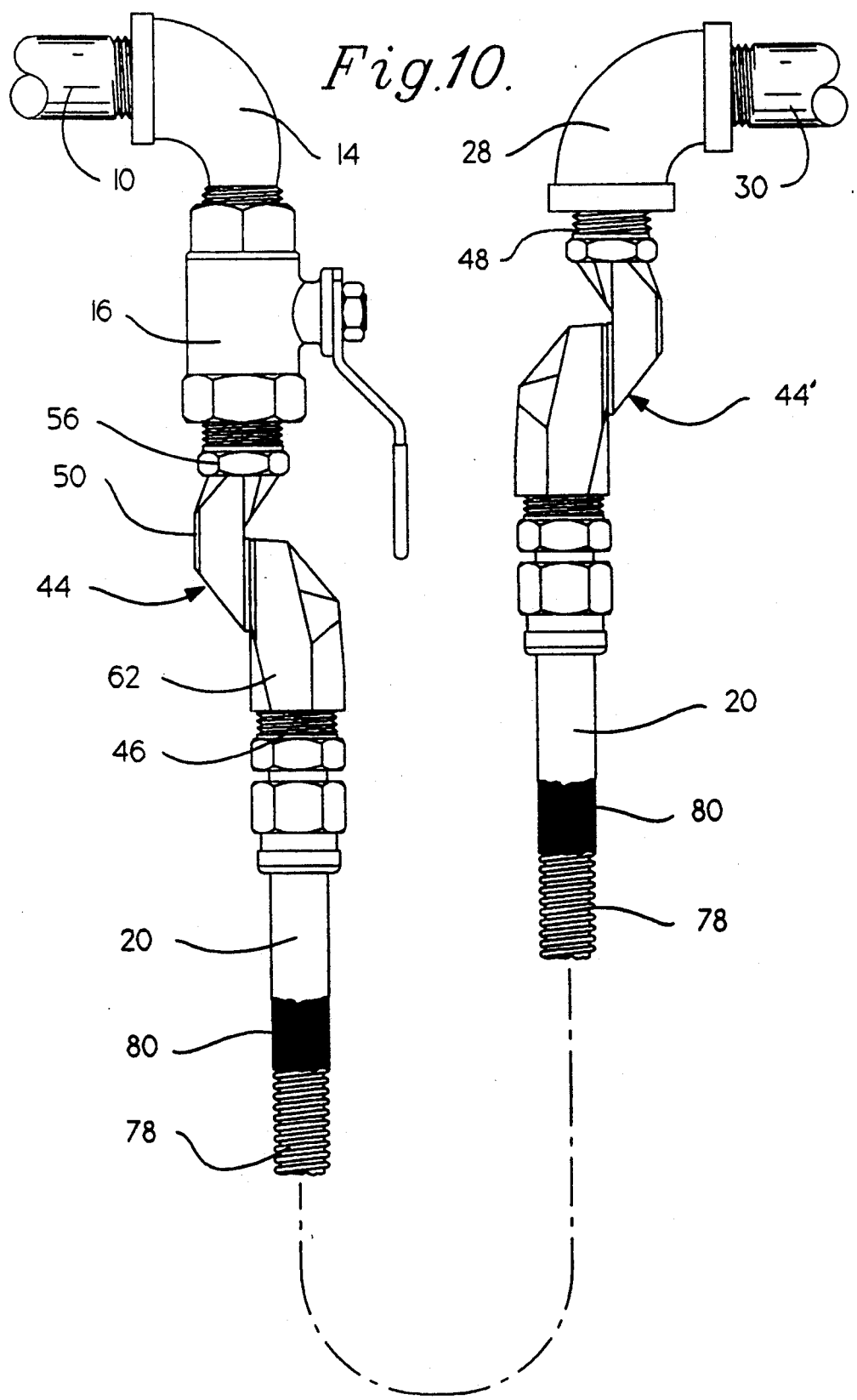
FIG. 10 is an elevational view of another embodiment of a gas appliance coupled with a connector assembly to a gas supply line using two swivels.

FIG. 10 shows another embodiment of the invention shown in FIG. 4 with the addition of another identical second swivel 44' which couples the connector 20 to the 90° street elbow 28 which is connected to the appliance pipe 30.

Figure 11:
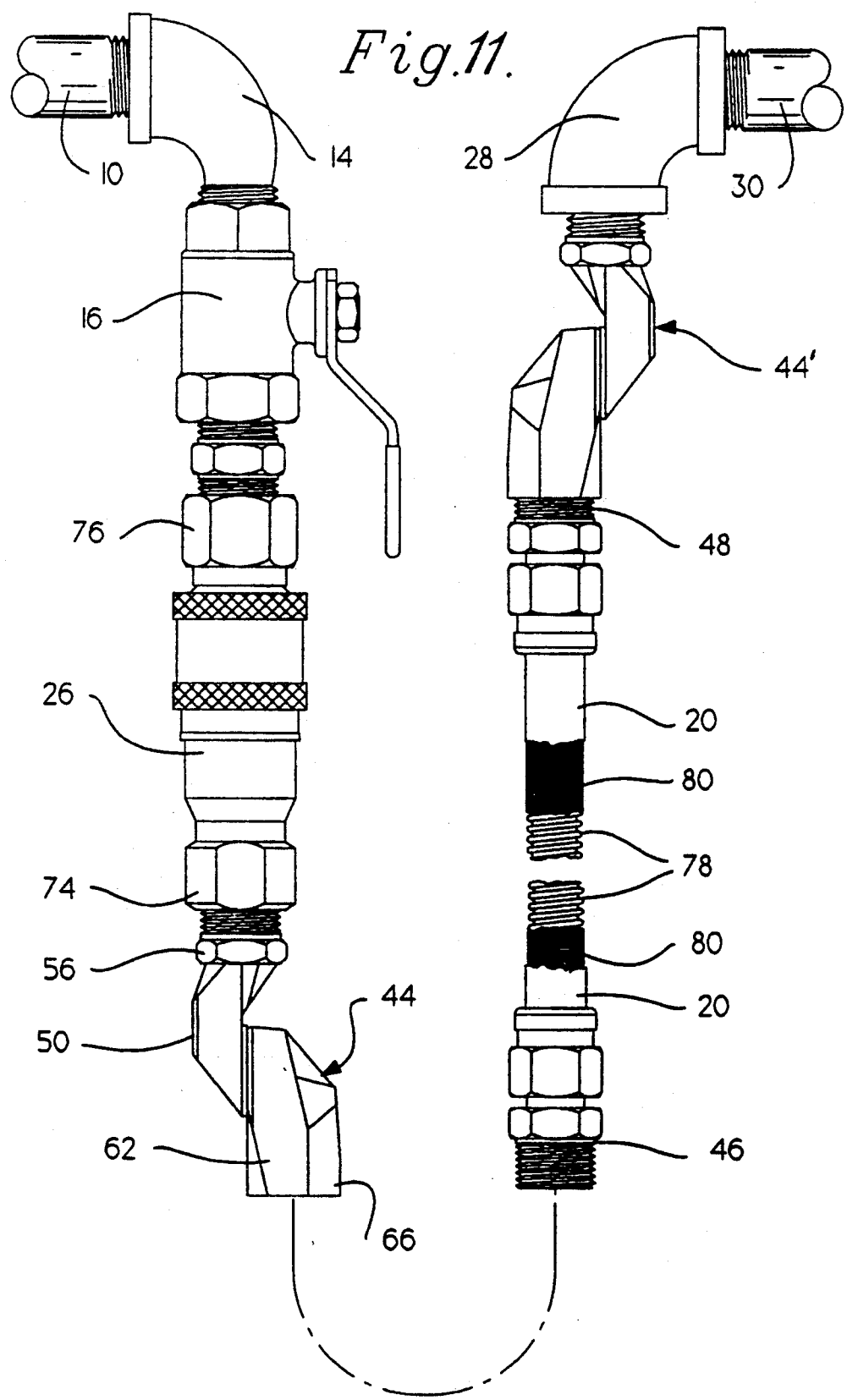
FIG. 11 is an arrangement similar to FIG. 10 having a quick-disconnect coupling device inserted between the swivel and the shut off valve.

FIG. 11 shows another embodiment of the invention shown in FIG. 10 with the quick-disconnect 26 coupling the swivel 44 to the shut-off valve 16.

Figure 12:
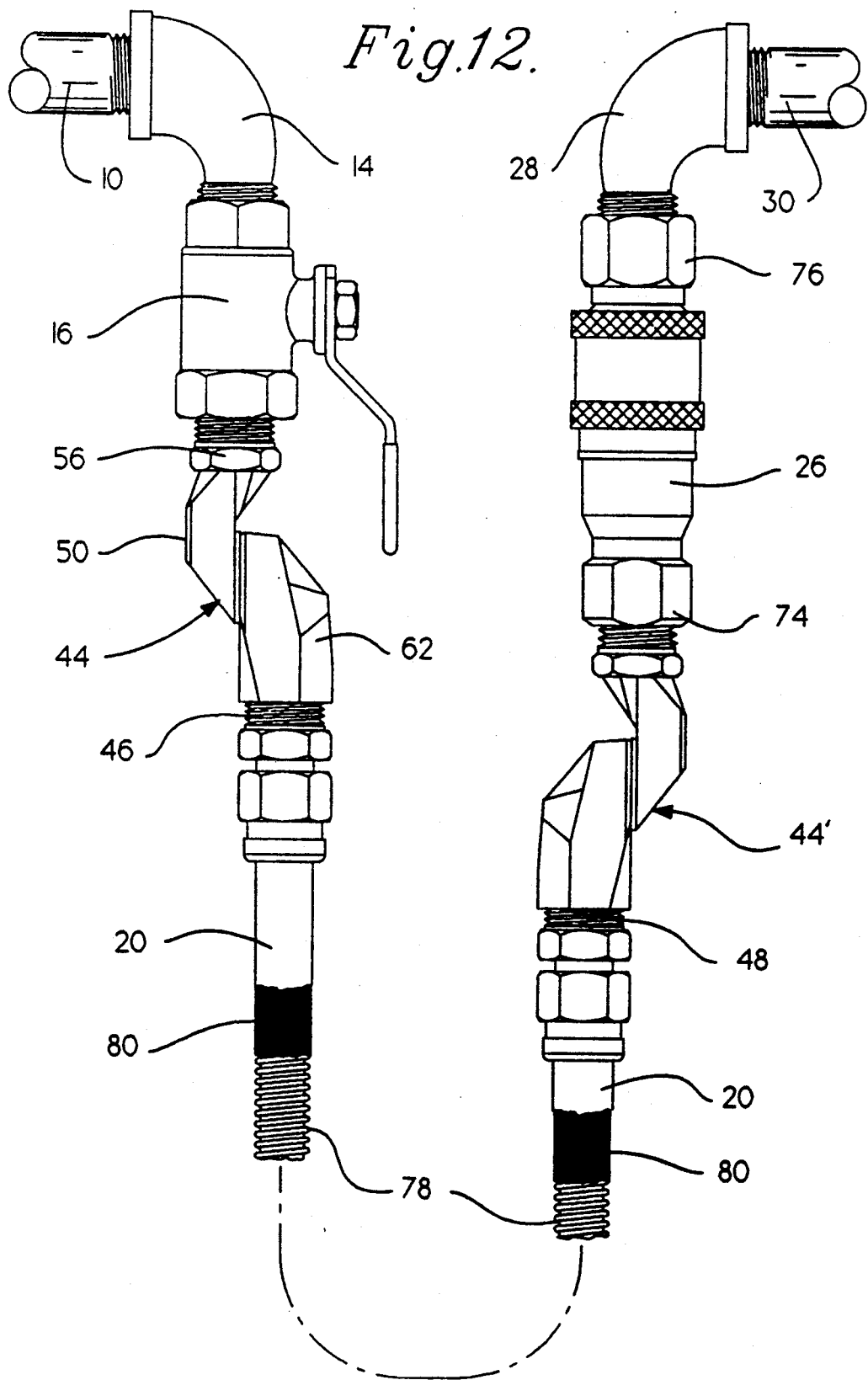
FIG. 12 is an arrangement similar to FIG. 10 having a quick-disconnect coupling device inserted between the swivel and the gas appliance.

FIG. 12 shows another embodiment of the invention shown in FIG. 10 with a quick-disconnect 26 coupling the swivel 44' to the 90° street elbow 28 which is threaded to the appliance pipe 30.

The swivels 44 and 44' are similar but not identical to that shown in U.S. Pat. No. 4,615,547 in which FIGS. 1 through 7 and the descriptive text referring to these figures are hereby incorporated by reference.

While I have described a present preferred embodiment of the invention, it is to be distinctly understood that the invention is not limited but may be otherwise embodied and practiced within the scope of the following claims.

I claim:

1. An apparatus for delivering natural gas or propane under pressure from a fixed pipe having a shut-off valve to a gas appliance mounted on casters which is moveable toward and away from the fixed pipe which comprises:
    (a) A swivel maintaining its shape and physical characteristics at least up to 800° F. temperature for at least ten minutes and having:
        (i) A first body member having a first and a second end;
        (ii) A nut rotatably coupled to the first end of the first body member, the first body member rotatable about a fixed first axis with respect to the nut, the nut having a male portion extending from the nut and coupled to the shut-off valve; and
        (iii) A second body member having a first and a second end, the first end of the second body member rotatably coupled to the second end of the first body member, the first end of the second body member rotatable about a second axis which intersects the fixed first axis and which is rotatable with respect to the fixed first axis, the second body member having a third axis at the second end and adjacent to the fixed first axis and rotatable about the fixed first axis and intersecting the second axis; and
    (b) A corrugated flexible connector having a first and a second end, the first end of the connector coupled to the second end of the second body member of the swivel, the second end of the connector coupled to the gas appliance.

2. An apparatus as recited in claim 1 wherein the swivel is resistive to corrosive materials in food grease cutting agents.

3. An apparatus as recited in claim 1 wherein the rotatable nut is brass and the first and second body members of the swivel are aluminum.

4. An apparatus as recited in claim 1 wherein the connector is formed by corrugated stainless steel tubing having a braided stainless steel sheath protector surrounding the corrugated tubing.

5. An apparatus as recited in claim 1 including a quick-disconnect coupling device, coupling the first end of the first body member of the swivel to the shut-off valve.

6. An apparatus as recited in claim 1 including a quick disconnect coupling device coupling the second end of the connector to the gas appliance.

7. An apparatus as recited in claim 1 wherein the fixed first axis is oriented at an angle with respect to the second axis.

8. An apparatus as recited in claim 4 including a coating of protective plastic surrounding the braided sheath.

9. An apparatus for delivering natural of propane gas under pressure from a fixed pipe having a shut-off valve to a gas appliance mounted on casters which is moveable toward and away from the fixed pipe which comprises:

(a) A swivel maintaining its shape and physical characteristics at least up to 800° F. temperature for at least ten minutes and having:
  (i) A first body member having a first and a second end;
  (ii) A nut rotatably coupled to the first end of the first body member, the first body member rotatable about a first axis with respect to the nut and which axis is fixed relative to the gas appliance, the nut having a male portion extending from the nut and coupled to the gas appliance; and
  (iii) A second body member having a first and a second end, the first end of the second body member rotatably coupled to the second end of the first body member, the first end of the second body member rotatable about a second axis which intersects the first axis and which is rotatable with respect to the first axis, the second body member having a third axis at the second end and adjacent to the first axis and rotatable about the first axis and intersecting the second axis; and
(b) A corrugated flexible connector having a first and a second end, the second end of the connector coupled to the second end of the second body member of the swivel, the first end of the connector coupled to the shut-off valve.

10. An apparatus as recited in claim 9 wherein the swivel is resistive to corrosive materials in food grease cutting agents.

11. An apparatus as recited in claim 9 wherein the rotatable nut is brass and the first and second body members of the swivel are aluminum.

12. An apparatus as recited in claim 9 wherein the connector is formed by corrugated stainless steel tubing having a braided stainless steel sheath protector surrounding the corrugated tubing.

13. An apparatus as recited in claim 9 including a quick disconnect coupling device coupling the first end of the connector to the shut-off valve.

14. An apparatus as recited in claim 9 including a quick-disconnect coupling device coupling the first end of the first body member of the swivel to the gas appliance.

15. An apparatus as recited in claim 9 wherein the first axis is oriented at an angle with respect to the second axis.

16. An apparatus as recited in claim 12 including a coating of protective plastic surrounding the braided sheath.

17. An apparatus for delivering natural or propane gas under pressure from a fixed pipe having a shut-off valve to a gas appliance mounted on casters which is moveable toward and away from the fixed pipe which comprises:

(a) A first swivel maintaining its shape and physical characteristics at least up to 800° F. temperature for at least ten minutes and having:
  (i) A first body member having a first and a second end;
  (ii) A nut rotatably coupled to the first end of the first body member, the first body member rotatable about a first axis with respect to the nut and which axis is fixed relative to the gas appliance, the nut having a male portion extending from the nut and coupled to the shut-off valve; and
  (iii) A second body member having a first and a second end, the first end of the second body member rotatably coupled to the second end of the first body member, the first end of the second body member rotatable about a second axis which intersects the fixed first axis and which is rotatable with respect to the fixed first axis, the second body member having a third axis at the second end and adjacent to the fixed first axis and rotatable about the fixed first axis and intersecting the second axis;
(b) A corrugated flexible connector having a first and a second end, the first end of the connector coupled to the second end of the second body member of the first swivel;
(c) A second swivel maintaining its shape and physical characteristics at least up to 800° F. temperature for at least ten minutes and having:
  (i) A first body member having a first and a second end;
  (ii) A nut rotatably coupled to the first end of the first body member, the first body member rotatable about a first axis with respect to the nut and which axis is fixed relative to the gas appliance, the nut having a male portion extending from the nut and coupled to the gas appliance; and
  (iii) A second body member having a first and a second end, the first end of the second body member rotatably coupled to the second end of the first body member, the first end of the second body member rotatable about a second axis which intersects the first axis and which is rotatable with respect to the first axis, the second body member having a third axis at the second end and adjacent to the first axis and rotatable about the first axis and intersecting the second axis, the second end of the second body member coupled to the second end of the connector.

18. An apparatus as recited in claim 17 wherein the first and second swivels are resistive to corrosive materials in food grease cutting agents.

19. An apparatus as recited in claim 17 wherein the rotatable nut of each swivel is brass and the first and second body members of each swivel are aluminum.

20. An apparatus as recited in claim 17 wherein the connector is formed by corrugated stainless steel tubing having a braided stainless steel sheath protector surrounding the corrugated tubing.

21. An apparatus as recited in claim 17 including a quick-disconnect coupling device coupling the first end of the first body member of the first swivel to the shut-off valve.

22. An apparatus as recited in claim 17 including a quick disconnect coupling device coupling the first end of the first body member of the second swivel to the gas appliance.

23. An apparatus as recited in claim 17 wherein the first axis of each swivel is oriented at an angle with respect to the second axis of each swivel.

24. An apparatus as recited in claim 20 including a coating of protective plastic surrounding the braided sheath.

* * * * *